US007011276B2

(12) United States Patent
Stephan

(10) Patent No.: US 7,011,276 B2
(45) Date of Patent: Mar. 14, 2006

(54) CARRYING OR GUIDING DEVICE FOR AIRCRAFT COMPONENTS

(75) Inventor: Walter Alfred Stephan, St. Martin (AT)

(73) Assignee: Fischer Advanced Composite Components AG, Ried im Innkreis (AT)

( * ) Notice: Subject to any disclaimer, the term of this patent is extended or adjusted under 35 U.S.C. 154(b) by 0 days.

(21) Appl. No.: 10/493,604

(22) PCT Filed: Sep. 16, 2002

(86) PCT No.: PCT/AT02/00266

§ 371 (c)(1),
(2), (4) Date: Nov. 17, 2004

(87) PCT Pub. No.: WO03/035469

PCT Pub. Date: May 1, 2003

(65) Prior Publication Data

US 2005/0082434 A1    Apr. 21, 2005

(30) Foreign Application Priority Data

Oct. 24, 2001  (AT) .............................. A 1690/2001

(51) Int. Cl.
*B64C 9/02* (2006.01)
(52) U.S. Cl. ...................................... 244/216; 244/123
(58) Field of Classification Search ............... 244/123, 244/131, 132, 133, 117 R, 119
See application file for complete search history.

(56) References Cited

U.S. PATENT DOCUMENTS

| 2,112,154 | A | * | 3/1938 | Hall ........................... 244/216 |
| 4,451,528 | A | * | 5/1984 | Krause ..................... 428/300.4 |
| 4,542,869 | A | * | 9/1985 | Brine .......................... 244/216 |
| 4,840,331 | A | * | 6/1989 | Williams .................... 244/212 |
| 5,171,510 | A |   | 12/1992 | Barquet et al. |
| 5,216,799 | A | * | 6/1993 | Charnock et al. ........ 29/525.02 |
| 5,230,487 | A | * | 7/1993 | Gartelmann et al. ........ 244/216 |
| 5,661,945 | A |   | 9/1997 | Henriksson et al. |
| 5,788,190 | A | * | 8/1998 | Siers .......................... 244/212 |
| 5,981,023 | A | * | 11/1999 | Tozuka et al. .............. 428/105 |
| 6,237,304 | B1 | * | 5/2001 | Wycech ..................... 52/731.6 |
| 6,719,870 | B1 | * | 4/2004 | Ludin et al. ................ 156/293 |
| 6,739,553 | B1 | * | 5/2004 | Nunn et al. ................. 244/123 |
| 6,776,371 | B1 | * | 8/2004 | Tanaka et al. .......... 244/117 R |

FOREIGN PATENT DOCUMENTS

| EP | 0 356 142 A2 | 2/1990 |
| FR | 2 679 866 A1 | 2/1993 |

* cited by examiner

*Primary Examiner*—Galen Barefoot
(74) *Attorney, Agent, or Firm*—Jacobson Holman PLLC

(57) ABSTRACT

A carrying or guiding device for aircraft components, in particular for landing flaps arranged on an aircraft wing, including a carrier having a substantially U-shaped section with substantially parallel side walls, and a cover plate arranged at the open side. To minimize weight, facilitate manufacture and mounting, and provide sufficient strength, the carrier and the cover plate are made of fiber reinforced plastic, in particular of carbon fiber (CF) reinforced plastic. The connection between the carrier and the cover plate and any possible connecting elements is preferably provided by gluing and, possibly, by additional rivet or screw connections.

20 Claims, 5 Drawing Sheets

CARRYING OR GUIDING DEVICE FOR AIRCRAFT COMPONENTS

This is a nationalization of PCT/AT02/00266 filed Sep. 16, 2002 and published in German.

BACKGROUND OF THE INVENTION

1. Field of the Invention

The invention relates to a carrying or guiding device, respectively, for aircraft components, in particular for landing flaps arranged on an aircraft wing comprising a carrier with substantially U-shaped section and substantially parallel side walls.

Even though the present description and the examples given mainly refer to a carrying and guiding device for landing flaps, the present invention can also be used e.g. as a suspension means for aircraft engines.

2. Description of the Related Art

A carrying and guiding device for a landing flap of the indicated type is known from DE 41 07 556 C1, e.g., which has a carrier of a substantially U-shaped section made of cast aluminum and provided with load rails for guiding a carriage that is connected to the landing flap. To ensure the required strength, stiffening elements in the form of a torsion box, a carriage strap and a crossbrace are provided. During starting and landing, the landing flaps are extended so as to provide for an increased ascending force. In doing so, naturally enormous stresses will act on the landing flaps and, as a consequence, also on the carrying and guiding devices, and therefore they must have particularly high strength values. The movement of the landing flap usually is transmitted to the landing flaps via a spindle extending in the aircraft wing and appropriate gearings. In this case, a gearing is castened to the carrying or guiding device, respectively, which gearing shifts and pivots the landing flap e.g. via a lever. In doing so, high torques are introduced into the carrier which must not negatively affect its structure. Also if the landing flap jams, the carrier of the carrying and supporting device must not be destroyed. Therefore, such carriers usually are made of steel, aluminum or titanium with an appropriate number of reinforcing elements. This results in a relatively heavy weight which should be avoided in aviation technology because of the higher fuel consumption resulting therefrom and, moreover, in high production and mounting expenditures. This also increases the production, operation and maintenance costs.

SUMMARY OF THE INVENTION

Therefore, the present invention has as its object to provide a carrying or guiding device, respectively, of the initially defined type, which, while meeting the necessary strength criteria, has a particularly low weight and, moreover, consists of as few individual parts as possible so that the production and mounting expenditures can be reduced. The disadvantages of known devices shall be avoided or reduced.

The object according to the invention is achieved in that the carrier is made of fiber reinforced plastic, in particular of carbon fiber reinforced plastic. By using a fiber reinforced plastic for the carrier, a low weight can be achieved, on the one hand, and the number of the individual parts of the carrying and guiding device, respectively, can be reduced, on the other hand, by the integral mode of construction when using plastics. Besides carbon fibers for reinforcing the plastics, also glass fibers or aramide fibers can be used, carbon fibers having advantages as regards their stiffness and strength as well as their improved processability. The production of the carrier of fiber reinforced plastic can be effected in a known manner by arranging resin-impregnated fabric layers, so-called prepregs, on a mold and curing the arrangement in an autoclave under heat and pressure.

According to a further feature of the invention it is provided that projecting flanges are arranged at the ends of the side walls of the carrier. These flanges which preferably are made in one working procedure with the carrier provide the carrier with a greater strength, on the one hand, and offer possible fastening means for structural elements to be connected thereto, on the other hand.

To increase the stiffness of the carrier, preferably a cover plate is provided at the open side of the carrier. When flanges are arranged on the carrier, this cover plate may simply be formed by a plane structural element which is connected to the carrier via the said flanges, e.g. glued and/or riveted thereto.

To increase the strength of the carrier, stiffening structures may be arranged on the side walls thereof, e.g. in the form of sections of Z-shaped, U-shaped or I-shaped cross-sections or also hat sections.

To further increase the strength of the carrier, connecting elements may be arranged between the side walls which preferably may be formed by tubular elements. Such tubular elements have a relatively low weight and provide the arrangement with great strength by moments introduced in one side wall or shear forces occurring there being conducted into the other side wall via the connecting elements, or moments or shear forces occurring on both sides being conducted into the interior of the connecting elements.

For a simple fastening of the connecting elements between the side walls of the carrier, the former may be designed with lateral, flange-like extensions which will offer a larger glueing surface or engagement surface for connecting elements, such as, e.g., rivets or screws.

To further reduce the weight of the carrying or guiding device, respectively, and also to allow for a passage through the device, the side walls of the carrier, according to a further feature of the invention, have openings corresponding to the tubular connecting elements. These openings hardly reduce the strength of the arrangement and allow, e.g., for the passage of lines or also for the arrangement of a gearing part to initiate the movement of a landing flap.

The stiffening structures and/or connecting elements and/or cover plate are preferably connected to the carrier by gluing, heat bonding being particularly preferred.

To attain an appropriate lasting strength, also connecting elements, such as rivets, screws or the like may be provided in addition to the gluing. However, due to the glued connections present, considerably fewer connecting elements will be required as compared to known devices, by which in turn weight and also production and mounting costs can be saved. Usually, so-called threaded blind rivets are used as connecting elements in aviation technology. Such threaded blind rivets require a slight bias when being used and are mainly loaded in terms of shear and not in terms of tension.

To enable a more rapid additional connection with rivets or screws or the like, the carrier and/or stiffening structures and/or connecting elements and/or the cover plate have holes at the sites of the additional connecting elements through which the respective connecting elements, such as, e.g., rivets or screws or the like, may be put. By this, mounting bercomes remarkably less complex.

To locally increase the strength properties, the carrier may have thickened portions at the sites of connection to the stiffening structures and/or to the connecting elements and/ or to the cover plate, but also at sites of connection to other structural elements. By these thickened portions, tears in the carrier due to high wear are avoided. The dimensions and geometries of such thickened portions will be adapted to the respective requirements.

If fastening or adapter elements or the like, in particular made of metal, are arranged on the carrier, the connections of the carrier to structural elements of the aircraft, on the one hand, and the connections to the aircraft components to be carried or guided, respectively, on the other hand, can be realized. For instance, in case of a carrying and guiding device for a landing flap of an aircraft, a guide rail of metal is arranged on the carrier, the carriage connected to the landing flap rolling on said carrier during retraction and extension of the landing flap. Moreover, fastening elements of metal are required for mounting the gearing, for adjusting the landing flap or for connecting the carrier to the aircraft wing.

These fastening elements may be connected to the carrier via corresponding counter pieces, e.g. via rivet connections.

Advantageously, in addition to the carrier also the cover plate and/or any possible stiffening structures and/or any possible connecting elements are made of fiber reinforced plastic, in particular of carbon fiber reinforced plastic. In this way, the advantages in terms of weight and production of the inventive carrying and guiding device can be even more emphasized.

Besides producing the structural elements of plastics, the carrier as well as any possible stiffening structures, connecting elements as well as the cover plate may be made of plastics material according to the so-called resin transfer molding method. With this production method, the formation of complicated three-dimensional structural elements having special properties is possible. Compared to conventional production methods employing an autoclave in which the prepreg material is cured, the resin transfer molding technology has its advantages.

To obtain further advantages in terms of weight and strength, the carrier as well as any possible stiffening structures, connecting elements as well as the cover plate may contain carbon fabric for reinforcement purposes.

If reactive materials, such as, e.g., nylon, are sewed or woven into the carbon fabric, certain properties, such as strength or impact resistance, can be enhanced. For instance, the carbon fabric used can be woven with nylon, and upon addition of the resin during the resin transfer molding method, the nylon material can be dissolved, whereby the impact resistance is enhanced.

BRIEF DESCRIPTION OF THE DRAWING

In the following, the invention will be further explained by way of an exemplary embodiment and with reference to the drawings.

Therein.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
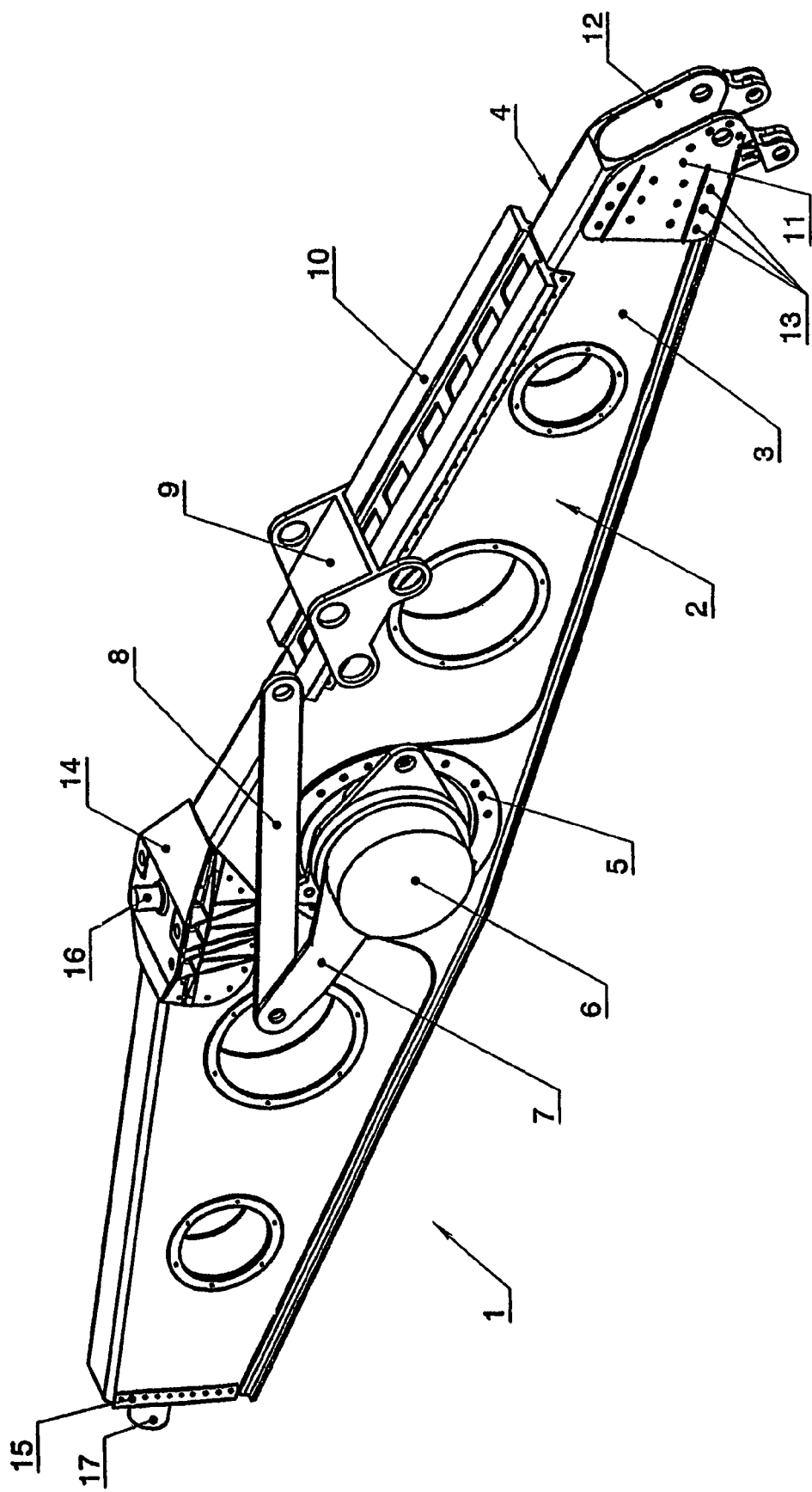
FIG. 1 shows a perspective view of a carrying or guiding device, respectively, for a landing flap of an aircraft.

FIG. 1 shows a perspective view of a carrying and guiding device 1 for a landing flap (not illustrated) arranged on an aircraft wing and consisting of a carrier 2 with a substantially U-shaped section and whose side walls 3, 4 are arranged substantially in parallel to each other. According to the prior art, such a carrier 2 is made of metal, e.g. of steel or of aluminum-titanium alloys. According to the invention, the carrier 2 is made of fiber reinforced plastic, in particular carbon fiber reinforced plastic. On one side wall 3 of the carrier 2, e.g. a gearing 6 is arranged via an adapter ring 5, which gearing, via an appropriate lever 7, 8, can move the landing flap (not illustrated) connected thereto. A carriage 9 which rolls on a guide rail 10 connected to the carrier 2 while the landing flap is extended or retracted is connected to the landing flap. After the landing flap has been extended, a steep tilting downward movement will occur, which movement is assisted by a directing element (not illustrated) connected to the end of the carrier 2. For fastening such a directing element, further fastening elements 11, 12 may be provided on the end of the carrier 2. These fastening elements may be glued to the carrier 2 and may be additionally connected also by means of rivets 13 or the like for an increased safety. For the mounting of the carrier 2 on an aircraft wing, e.g., further fastening plates 14, 15 as well as possible centering pins 16, 17 are provided. When using the inventive carrying or guiding device 1, respectively, for suspending an engine on an aircraft wing, the gearing 6, the levers 7, 8, the carriage 9 as well as the guide rail 10 naturally will not be required, and the fastening elements 11, 12, 14, 15 as well as any possible centering pins 16, 17, will be designed differently.

Figure 2:
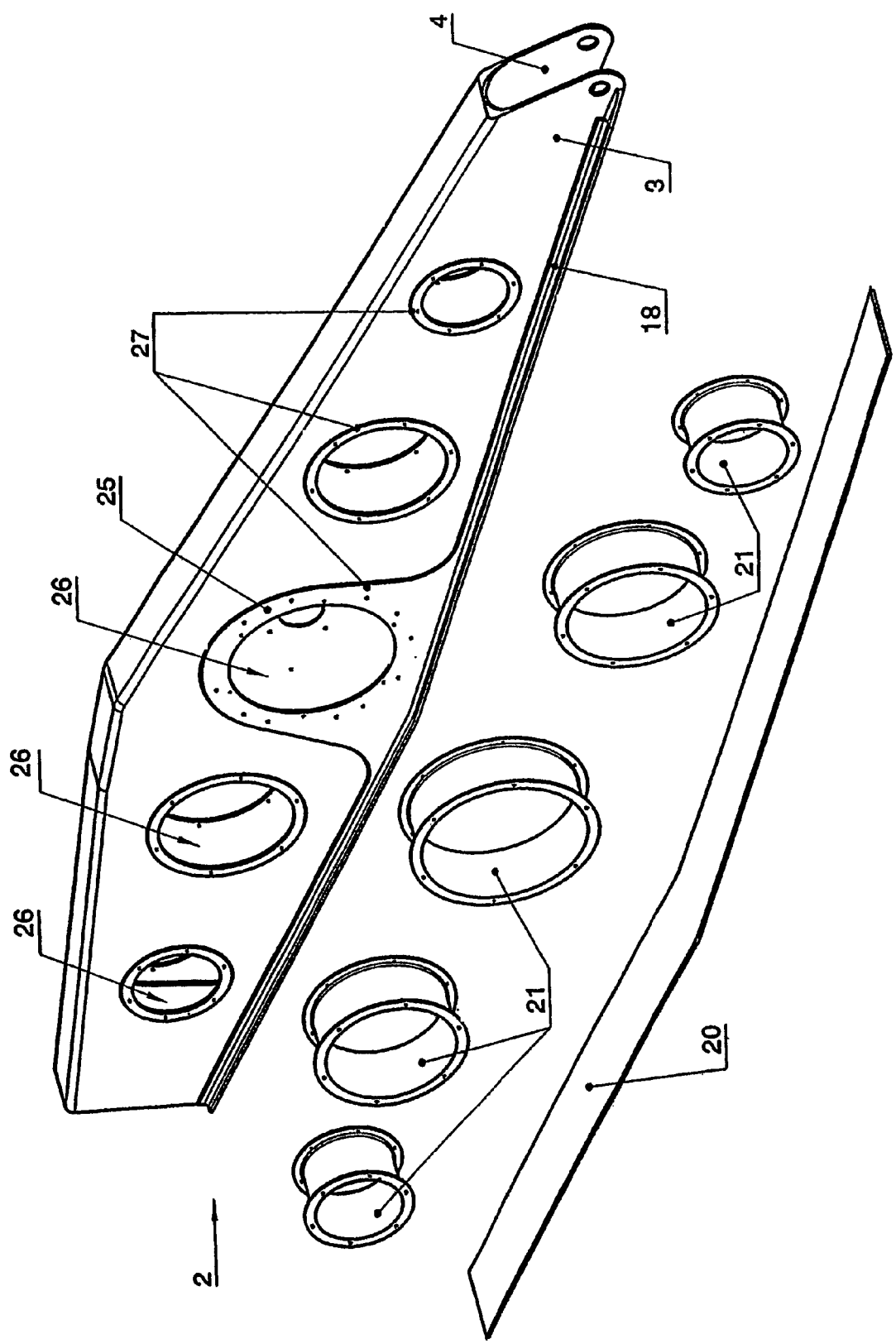
FIG. 2 shows a perspective exploded view of the carrier according to the invention.
Figure 4:
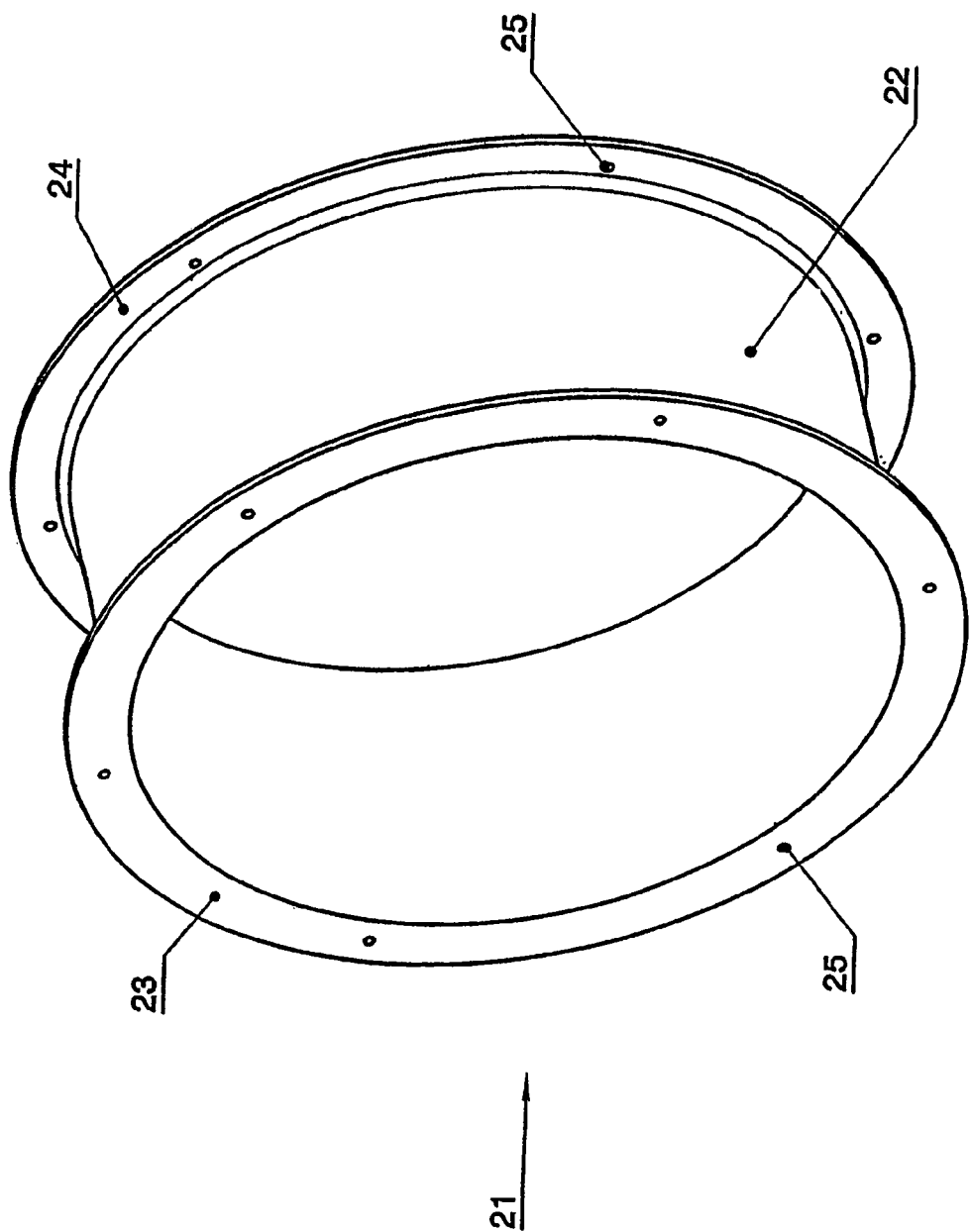
FIG. 4 shows a perspective view of a tubular connecting element.

FIG. 2 shows a perspective exploded illustration of an embodiment of a carrier 2 according to the invention, which has a substantially U-shaped section and substantially parallel side walls 3, 4. At the ends of the side walls 3, 4 of the carrier 2, flanges 18, 19 projecting from either side are arranged which increase the stiffness of the carrier 2, on the one hand, and facilitate a connection to other structural elements, on the other hand. To increase the stiffness of the carrier 2, a cover plate 20 is arranged at the open side of the carrier 2. In the simplest case, the cover plate 20 is plane or configured with a bend corresponding to the shape of the carrier 2, and it is connected, preferably glued, to the carrier 2 via the flanges 18, 19. To make the connection lasting, a certain number of connecting elements having the form of rivets or screws may be provided in addition to gluing, and holes required therefor preferably already being made before mounting. To further stiffen the carrier 2, stiffening structures having the form of sections may be provided on the side walls 3, 4, preferably on the inner side of the side walls 3, 4 (not illustrated). In order to transmit moments and shear forces from one side wall 3, 4 to the other side wall 4, 3 of the carrier 2, connecting elements 21 may additionally be provided between the side walls 3, 4, which connecting elements, just like the carrier 2 and the cover plate 20, preferably also are made of fiber reinforced plastic, in particular carbon fiber reinforced plastic (CFRP). To minimize the weight, the connecting elements 21 preferably are formed by tubular elements 22 which may be provided with lateral flange-like extensions 23, 24 for a better mounting thereof (cf. FIG. 4). In the flange-like extensions 23, 24, possible holes 25 may be provided for the arrangement of connecting elements therein, such as rivets or screws. Preferably, the connecting elements 21 are connected to the side walls 3, 4 of the carrier 2 by gluing. In order to increase the safety, however, screw or rivet connections may additionally be provided.

Figure 3:
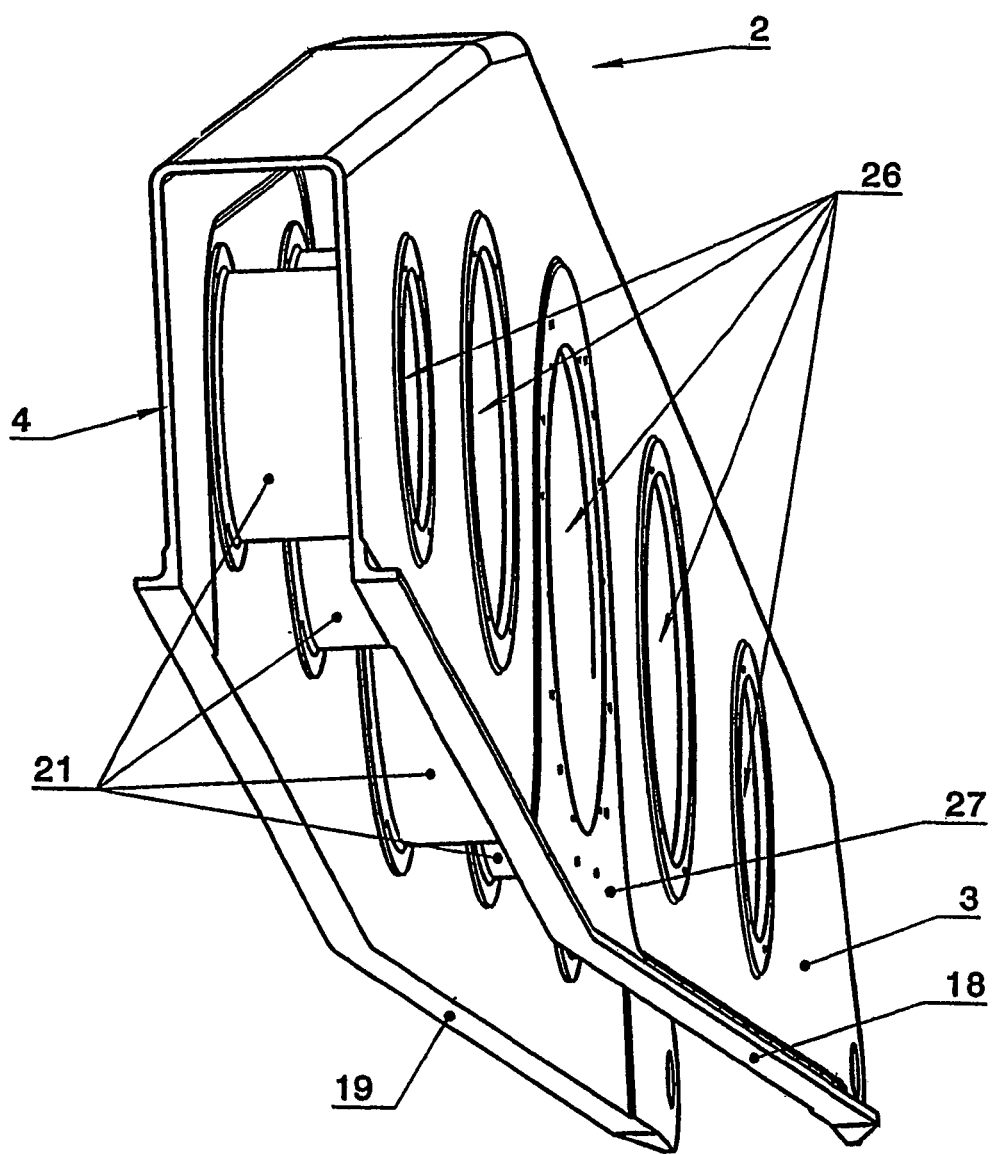
FIG. 3 shows a perspective view of the carrier with the connecting elements arranged between the side walls.

FIG. 3 shows a perspective view of the carrier 2 with the connecting elements 21 arranged between the side walls 3, 4 viewed from below. The cover plate 20 to be mounted over the protecting flanges 18, 19 has not been entered. Via the connecting elements 21, torques and shear forces are conducted from one side wall 3 into the other side wall 4 or torque or shear forces of the side walls 3, 4 are destroyed. The carrier 2 has openings 26 in its side walls 3, 4 corresponding to the tubular connecting elements 21, by means of which weight is saved, on the one hand, and the passage of cables or lines or the arrangement of structural components is rendered possible, on the other hand. For instance, in the middle opening 26 in the side walls 3, 4 of the carrier 2, the gearing 6 for extending and retracting the landing flaps will be arranged in case of a carrying and guiding device 1 for landing flaps.

The carrier 2 may comprise thickened portions 27 at sites of connection with the stiffening structures and/or the connecting elements 21 and/or the cover plate 20 or also at sites of connection to other structural elements, such as, e.g., the guide rail 10, which thickened portions may be realized by arranging additional fabric layers if the carrier 2 is made with resin-impregnated fabric layers.

Figure 5:
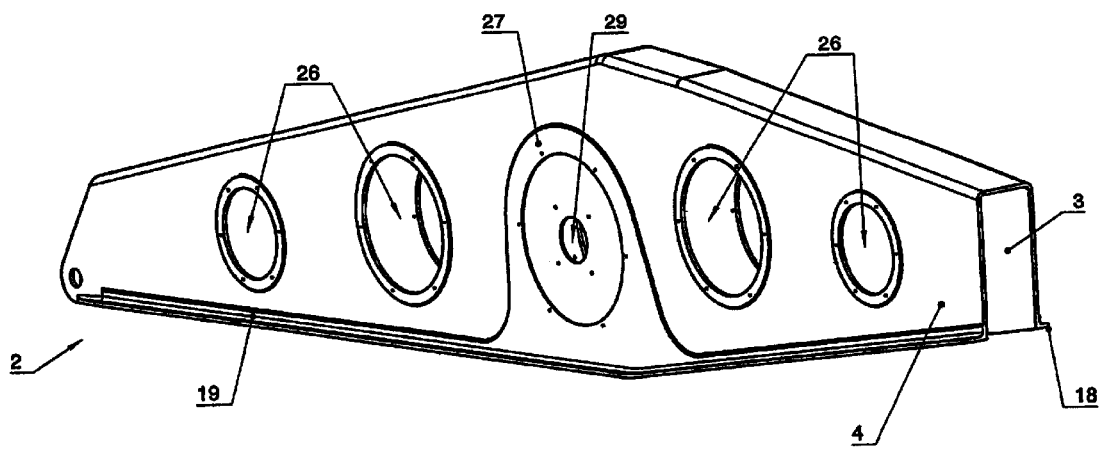
FIG. 5 shows a further perspective view of the carrier according to FIG. 2 from the rear side.

Finally, FIG. 5 shows a perspective view of the carrier 2 from the rear side relative to FIG. 2. What is striking is that the opening 29 in the middle of side wall 4 has a smaller diameter than the opening 26 in the middle of side wall 3. In case of a carrier 2 for a landing flap, this will serve to accommodate a so-called torque-limiter which delimits the torque acting on the landing flap so as to prevent a destruction of the carrier 2.

By the inventive production of the carrier 2, preferably in combination will all the connecting elements 21 as well as with the cover plate 20 of fiber reinforced plastic, a construction of low weight is achieved. Furthermore, by the production methods common in plastics technology, an integral mode of construction may be used and the number of individual components may be greatly reduced so that the production expenditures as well as the mounting procedure can be markedly reduced. Besides the conventional production methods using an autoclave, individual components of the carrying or guiding device of the invention may also be produced according to the resin transfer moulding (RTM) method, in which dry fibers are introduced into a mold that corresponds to the object to be produced, and liquid resin of relatively low viscosity is introduced into the mold. Subsequently, the mold is heated so as to further lower the viscosity of the resin and to ensure an unimpeded flow of the resin into the mold. Thereafter, the resin will cure. According to the RTM method, complicated objects can be prepared easily, rapidly and at relatively low costs. Any possible reactive materials which are sewed to the fabric or woven therewith can be introduced easily into the mold and may develop certain properties upon introduction of the resin.

The shape of the inventive carrying or guiding device, respectively, can be arbitrarily adapted to the respective conditions and is not restricted to the shape illustrated.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. An aircraft component carrying or guiding device comprising:
    a carrier having a substantially U-shaped section with an open side, and substantially parallel side walls, said carrier being made of fiber reinforced plastic and said side walls each having a plurality of openings respectively aligned with corresponding openings in the other side wall;
    a cover plate provided substantially at said open side of the carrier; and
    a plurality of connecting elements for a connection to other structural elements, said connecting elements being arranged between the side walls of the carrier and in alignment with said aligned side wall openings, said connecting elements also being made of fiber reinforced plastic.

2. The device according to claim 1, wherein free ends of the side walls are provided with projecting flanges.

3. The device according to claim 1, wherein stiffening structures are arranged on the side walls of the carrier.

4. The device according to claim 1, wherein the fiber reinforced plastic is carbon fiber reinforced plastic (CFRP).

5. The device according to claim 1, wherein the side wall openings are generally circular and said connecting elements are formed by tubular elements having lateral flanges that extend over adjacent edges of said openings.

6. The device according to claim 3, wherein the stiffening structures and/or connecting elements and/or the cover plate are connected with the carrier by gluing.

7. The device according to claim 6, wherein additional connectors including rivets or screws are provided in addition to the gluing.

8. The device according to claim 7, wherein the carrier and/or the stiffening structures and/or the connecting elements and/or the cover plate have holes at the sites of the additional connectors.

9. The device according to claim 5, wherein the carrier has thickened portions on said edges.

10. The device according to claim 1, wherein the carrier has thickened portions at sites of connection to other structural elements.

11. The device according to claim 1, wherein said carrier includes fastening or adapter elements made of metal.

12. The device according to claim 11, wherein the fastening or adapter elements are connected to the carrier via corresponding counter pieces.

13. The device according to claim 3, wherein the cover plate and/or said stiffening structures are made of fiber reinforced plastic.

14. The device according to claim 13, wherein said fiber reinforced plastic is carbon fiber reinforced plastic (CFRP).

15. The device according to claim 1, wherein the carrier, the connecting elements and the cover plate are made of plastics material according to the resin transfer molding (RTM) method.

16. The device according to claim 15, wherein the carrier, the connecting elements and the cover plate contain carbon fabric for reinforcement purposes.

17. The device according to claim 16, wherein nylon is sewn or woven into the carbon fabric.

18. An aircraft component carrying or guiding device comprising:
- a carrier made of fiber reinforced plastic having a substantially U-shaped section with an open side, and substantially parallel side walls, free ends of the side walls having projecting flanges and each of said side walls having at least one generally circular opening;
- a cover plate provided substantially at said open side of the carrier and configured to be connected to said flanges; and
- a plurality of generally tubular connecting elements made of fiber reinforced plastic and extending between the side walls of the carrier so as to be spaced from said flanges, at least one of said tubular connecting elements extending between said side wall openings.

19. The device according to claim 18, wherein said side walls each have a plurality of openings respectively aligned with corresponding openings in the other side wall, each of said tubular connecting elements extending between a respective pair of aligned openings to provide a hollow passageway open on each side and extending through said U-shaped section.

20. The device according to claim 19, wherein said tubular elements have lateral flanges that extend over adjacent edges of said openings on outer surfaces of said side walls.

* * * * *

UNITED STATES PATENT AND TRADEMARK OFFICE
CERTIFICATE OF CORRECTION

| | | |
|---|---|---|
| PATENT NO. | : 7,011,276 B2 | Page 1 of 1 |
| APPLICATION NO. | : 10/493604 | |
| DATED | : March 14, 2006 | |
| INVENTOR(S) | : Walter Alfred Stephan et al | |

It is certified that error appears in the above-identified patent and that said Letters Patent is hereby corrected as shown below:

On the title page item (75) after (AT) insert "Hermann Filsegger, Ried im Innkreis, (AT) "

Signed and Sealed this

Twenty-fifth Day of July, 2006

JON W. DUDAS
*Director of the United States Patent and Trademark Office*